(12) United States Patent
Benjey

(10) Patent No.: US 6,837,256 B2
(45) Date of Patent: Jan. 4, 2005

(54) FILLER TUBE MOUNTED FUEL TANK REFUELING VALVE

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 54 days.

(21) Appl. No.: 10/245,217

(22) Filed: Sep. 17, 2002

(65) Prior Publication Data

US 2004/0050428 A1 Mar. 18, 2004

(51) Int. Cl.7 ............................ F16K 31/18; B65B 1/30
(52) U.S. Cl. .................. 137/15.26; 137/420; 137/421; 137/495; 137/512.2; 141/198; 251/74; 251/294
(58) Field of Search .................. 141/198; 137/420, 137/421, 42.2, 495, 512.2, 15.01, 15.26; 251/74, 294

(56) References Cited

U.S. PATENT DOCUMENTS

| | | | | |
|---|---|---|---|---|
| 2,384,628 A | * | 9/1945 | Krone et al. ................ | 141/113 |
| 2,504,638 A | * | 4/1950 | Browning ................... | 137/420 |
| 2,997,052 A | * | 8/1961 | Mangini ...................... | 137/77 |
| 4,305,422 A | * | 12/1981 | Bannink ..................... | 137/415 |
| 5,472,012 A | * | 12/1995 | Wood et al. ................ | 137/416 |
| 6,234,195 B1 | * | 5/2001 | Kippe et al. ............. | 137/493.3 |
| 6,648,016 B2 | * | 11/2003 | Farrenkopf et al. ......... | 137/588 |
| 2001/0054615 A1 | | 12/2001 | Krogull et al. ............ | 220/86.2 |

FOREIGN PATENT DOCUMENTS

DE     199 14 322     11/2000

* cited by examiner

Primary Examiner—A. Michael Chambers
(74) Attorney, Agent, or Firm—Roger A. Johnston

(57) ABSTRACT

A spring loaded valve member with a poppet on one end is disposed in a fuel tank with the inlet end connected to the filler tube. The valve member has a spool valve attached to the poppet. The poppet is opened by fuel discharging from a refueling nozzle and the valve member movement limited by a float operated latch such that fuel flows through the spool valve ports. Upon the float rising in the tank, the latch is released permitting the force of the flowing fuel to further move the valve member to close the spool valve.

25 Claims, 8 Drawing Sheets

FILLER TUBE MOUNTED FUEL TANK REFUELING VALVE

BACKGROUND OF THE INVENTION

Present fuel vapor emission requirements dictate that the fuel tank vapor be contained upon removal of the access door or closure cap for the tank filler tube in preparation for insertion of a refueling nozzle; and, the tank vapor must be contained automatically upon withdrawal of the refueling nozzle.

In addition, it is required upon refueling and the fuel level rising in the tank and up into the filler tube, that the nozzle shut off automatically in order to prevent fuel from backing up and spilling out of the upper end of the filler tube (e.g. "spit back"). Present motor vehicle fuel tank filler tubes have a bulkhead or partition near the upper or nozzle-receiving end typically with a hinged flapper valve closing an off-center aperture which is sized to closely interfit the refueling nozzle. In the event that the nozzle fails to automatically shut off upon fuel rising in the filler neck, spit back occurs through the nozzle receiving orifice. Thus, it is desired to have some provision for closing the filler tube when the fuel level rises to the top of the tank during refueling.

Furthermore, the vapor emission control valving must not only accommodate refueling operations but must make provision for draining of the tank in preparation for tank removal from the vehicle in the event this is required for servicing or repair of the vehicle. Therefore, provision must be made for the insertion of a siphoning hose into the tank through the filler neck.

Thus, it has long been desired to provide a way or means of controlling fuel vapor emission from the tank through the filler tube during refueling operations and to provide for insertion of the siphoning hose and to make such provision in a simple, easy to manufacture and low cost manner for high volume motor vehicle production.

BRIEF SUMMARY OF THE INVENTION

The present invention provides a normally closed poppet valve disposed within the fuel tank filler tube which has a sliding or hollow spool valve attached thereto which provides for flow therethrough when the poppet is opened under the pressure of fuel discharging from a refueling nozzle inserted into the filler tube. A float operated latch limits the movement of the slide valve during refueling until the fuel level reaches the top of the tank whereupon the float is raised releasing the latch and the slide valve is permitted to move to a lower or remote position closing off flow in the filler tube, whereupon the nozzle automatic shut off is deployed and the nozzle may be removed. The poppet includes a normally closed flapper valve disposed in the center thereof which is openable upon insertion of a siphoning hose therein in the event that fuel must be withdrawn from the tank for servicing, repairs or removal of the tank. Preferably the filler tube contains inwardly extending vanes for guiding the siphoning hose into the flapper valve for insertion through the valve and filler tube into the tank.

DETAILED DESCRIPTION OF THE INVENTION

Figure 1:
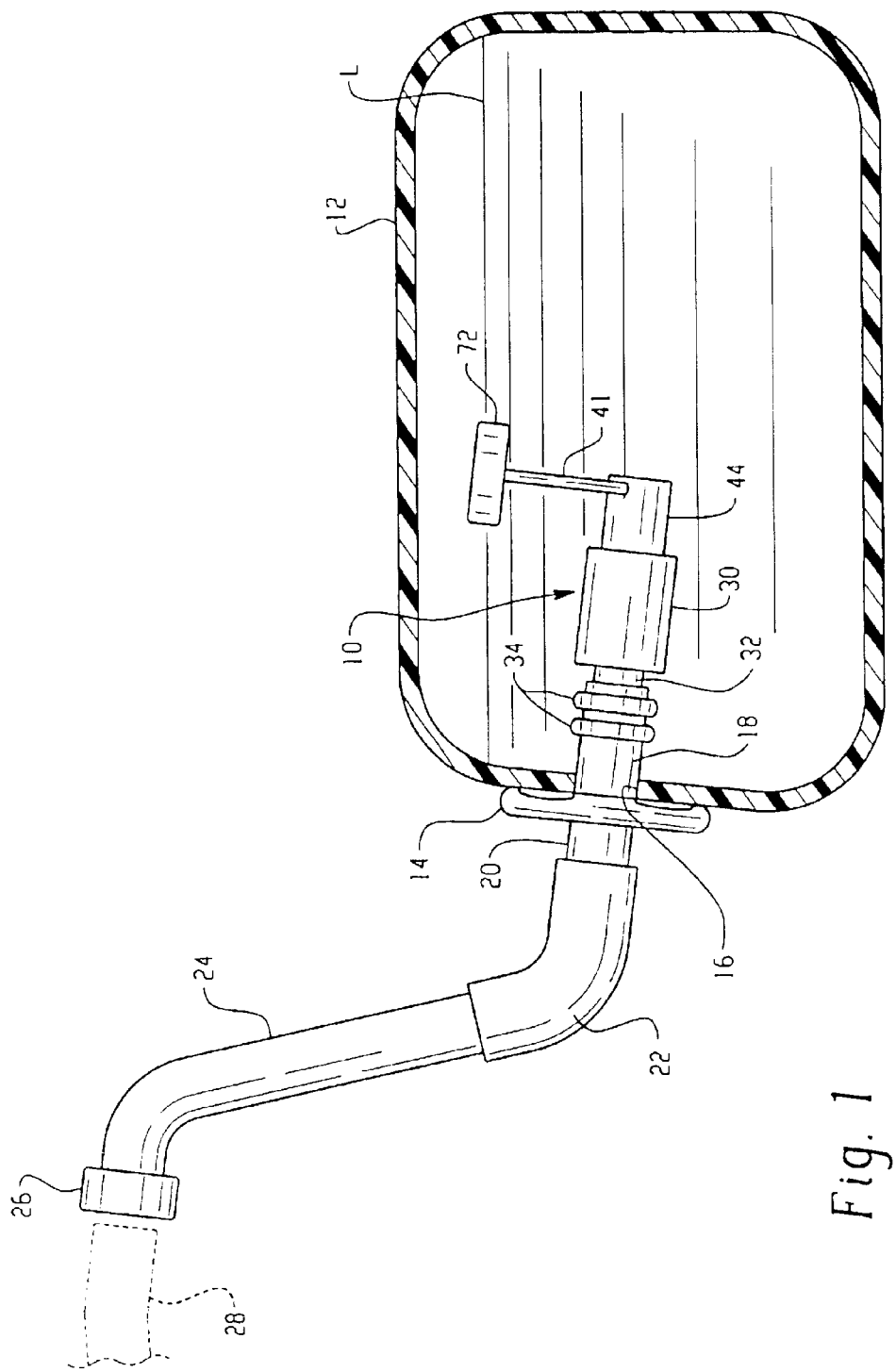
FIG. 1 is a schematic of a fuel tank with the valve of the present invention mounted in the tank and connected to the filler tube.

Referring to FIG. 1, the valve assembly of the present invention is indicated generally at 10 and is illustrated in FIG. 1 as disposed in a fuel tank 12 having liquid fuel to a level L. The tank 12 has a fitting 14 extending through an aperture 16 formed in the side wall of the tank with a portion thereof denoted by reference numeral 18 extending within the tank; and, the fitting 14 is sealed about the aperture 16 in any manner well known in the art as, for example, by weldment. Fitting 14 has a nipple 20 extending outwardly from the tank which is connected to a flexible hose 22 which is in turn connected to the lower end of a filler pipe 24 having its upper end 26 configured for receiving therein a suitable refueling nozzle shown in dashed outline in FIG. 1.

Referring to FIGS. 2 through 8, valve assembly 10 includes a housing 30 preferably having a hollow cylindrical configuration with a reduced diameter neck portion 32 extending from one end thereof, which neck is sized and configured for inter-fitting with and being sealed in the end 18 of fitting 14 and within the tank. The engagement of the neck portion 32 with the fitting end 18 may be accomplished in any suitable manner, as for example, by employing clamping bands 34 over the end of the fitting 18 or by providing annular barbs (not shown) on the neck portion 32.

The housing 30 has the end thereof remote from neck 32 configured to provide a generally cylindrical valving surface 36 which has a reduced diameter from the housing 30 and which has a slot 38 formed therein through which extends a latch member 40 which is pivotally mounted in the slot by a pivot pin 42 received axially in the wall of the annular portion 44 of the housing forming valving surface 36. In the presently preferred practice annular portion 44 is formed by a separate annular member sealingly secured in the end of housing 30 by any suitable expedient as, for example, weldment.

A moveable valve member indicated generally at 46 has a poppet 48 formed on one end thereof which is configured for seating against an annular valve seat 50 formed on the inner end of neck 32 extending within the housing; and, valve member 46 has a hollow tubular extension 52 or spool valve extending from the poppet and which is slidably received and guided in the cylindrical surface 36 formed in the annular member 44.

The moveable valve member 46 is biased leftward in the drawings in a direction to seat poppet 48 against valve seating surface 50 by a spring 54 which is nested over the member 46 and which has one end registered in grooves 56 formed in lugs 58 extending radially outwardly from the poppet 48. The opposite end of the spring 54 is registered against an annular flange 60 provided on annular member 44.

It will be understood that spring 54 has a relatively light spring rate for preload on the poppet 48 in order that the force of the fuel discharged from the refueling nozzle can readily compress the spring effecting movement of poppet 58 away from the seat 50.

The cylindrical portion 52 of the moveable valve member 46 has provided therein at least one and preferably a plurality of apertures preferably in the form of elongated slots as denoted by reference numeral 62. Slots 62 are sized such that when the poppet is moved to its extreme rightward position, the slots are closed off by the annular surface 36 formed in annular member 44.

Poppet 48 has provided in the center thereof a check valve indicated generally at 64 which is formed by an annular valve seat 66 provided in the center of the poppet with a hinged flapper door 68 provided thereon with a resilient seat 70 attached thereto for sealing against the seat 66. The flapper door 68 is biased to the closed position by a suitable spring (not shown); and, it will be understood that the unshown spring has a spring rate or preload greater than that of the spring 54 to prevent the check valve from opening under the force of fuel discharging from a refueling nozzle. The valve seat 66 is sized to permit a siphon hose of adequate diameter to be inserted therein and to force open the flapper door 68 in the event that it is necessary to remove the fuel from the tank for service.

Latch member 40 has an extension 41 which extends outwardly of the annular member 44 as a lever arm and has attached to the end thereof a float member 72 which functions in a manner hereinafter described.

Figure 2:
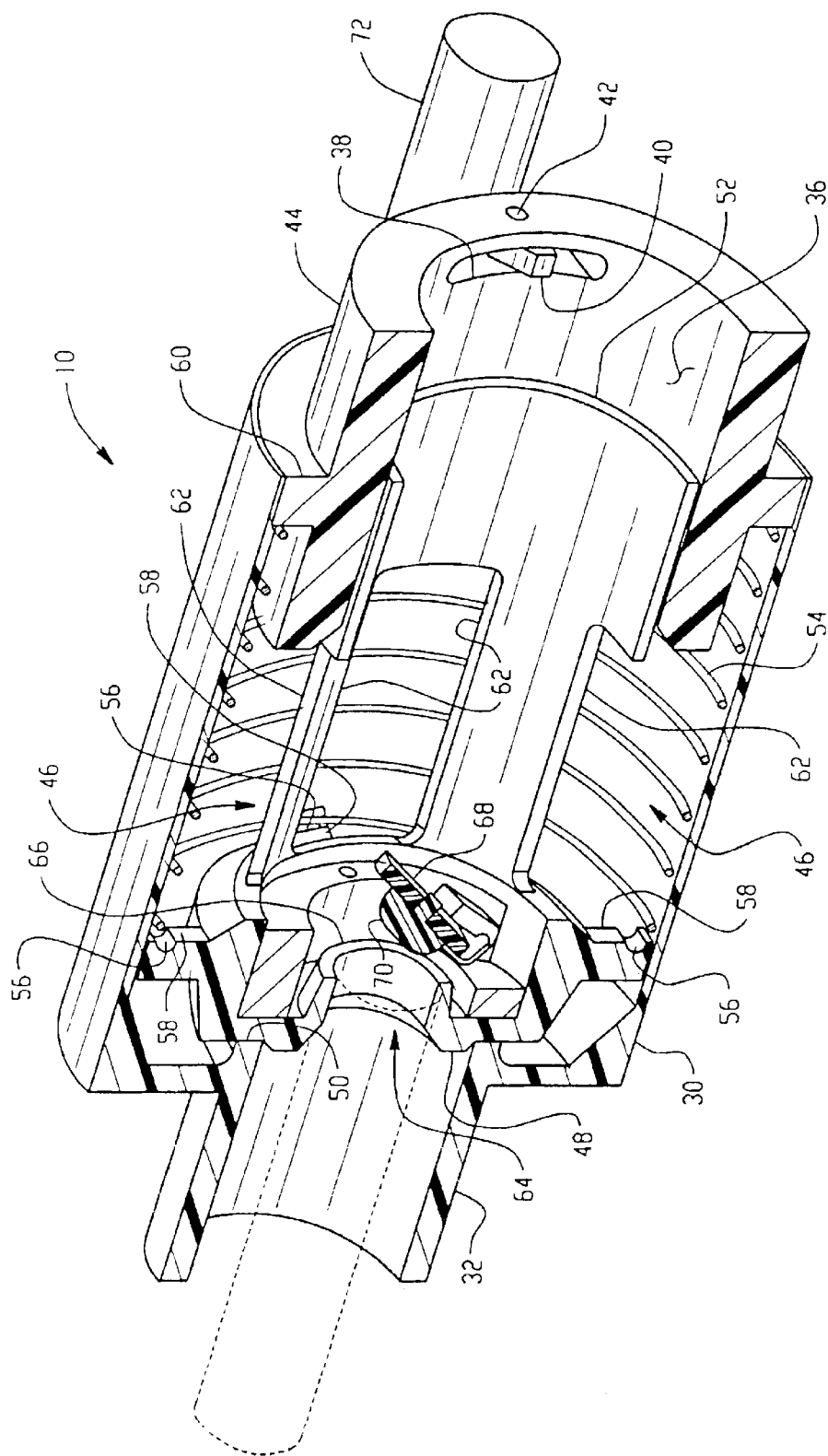
FIG. 2 is a broken-away view of one embodiment of the invention in the closed position prior to refueling operations.
Figure 3:
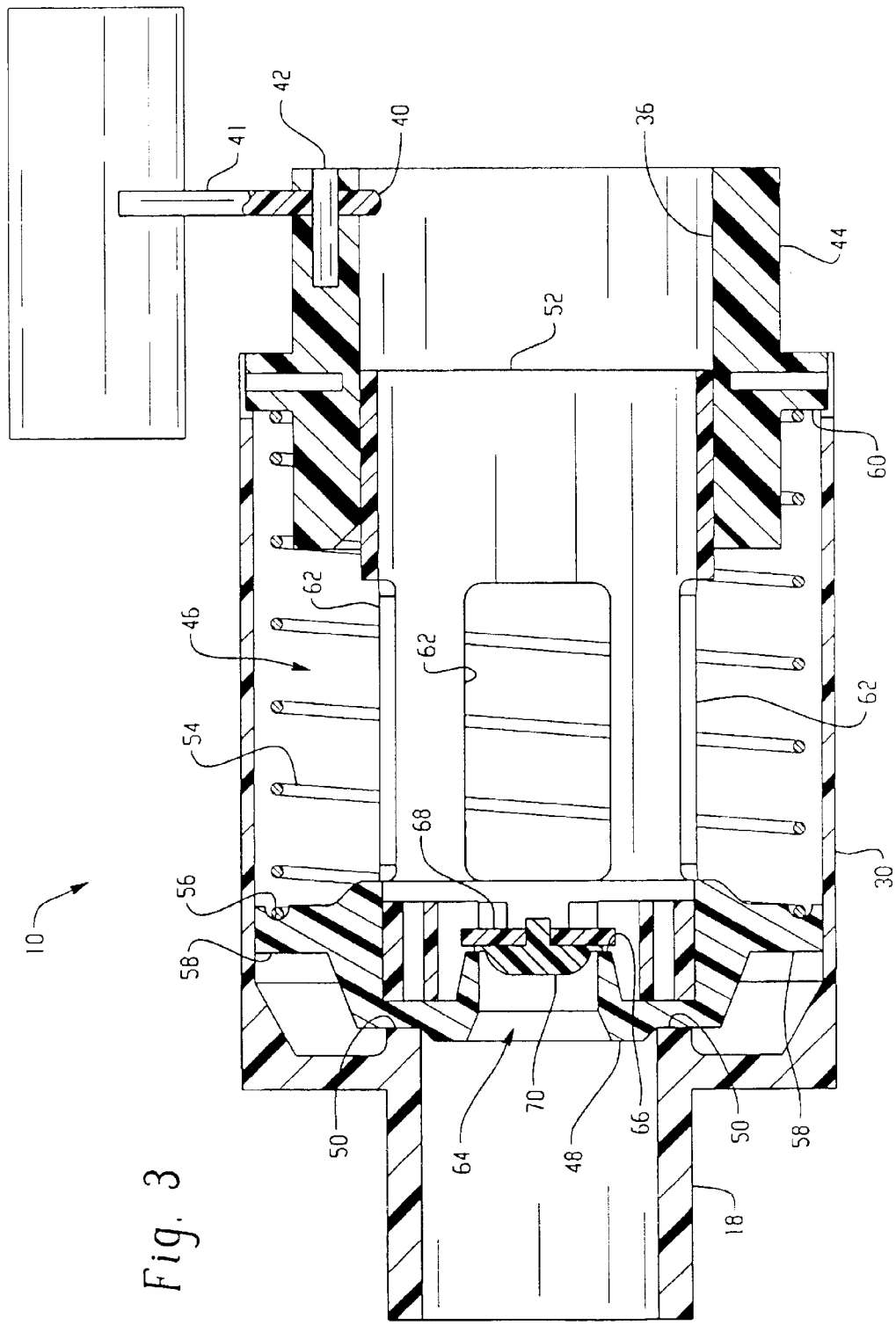
FIG. 3 is a cross-section of the embodiment of FIG. 2.

In operation, the valve assembly 10 is in the normally closed condition shown in FIGS. 2 and 3 with poppet 48 closed against seat 50 and the seal 70 on the flapper door of the check valve 64 is seated against valve seating surface 66. In the event that it is necessary to remove fuel from the tank, a siphon hose 74 is inserted through the filler tube and through nipple 32 into the interior housing 30 and forces open the flapper door 68 to permit the end of the hose to be further moved into the tank.

Figure 4:
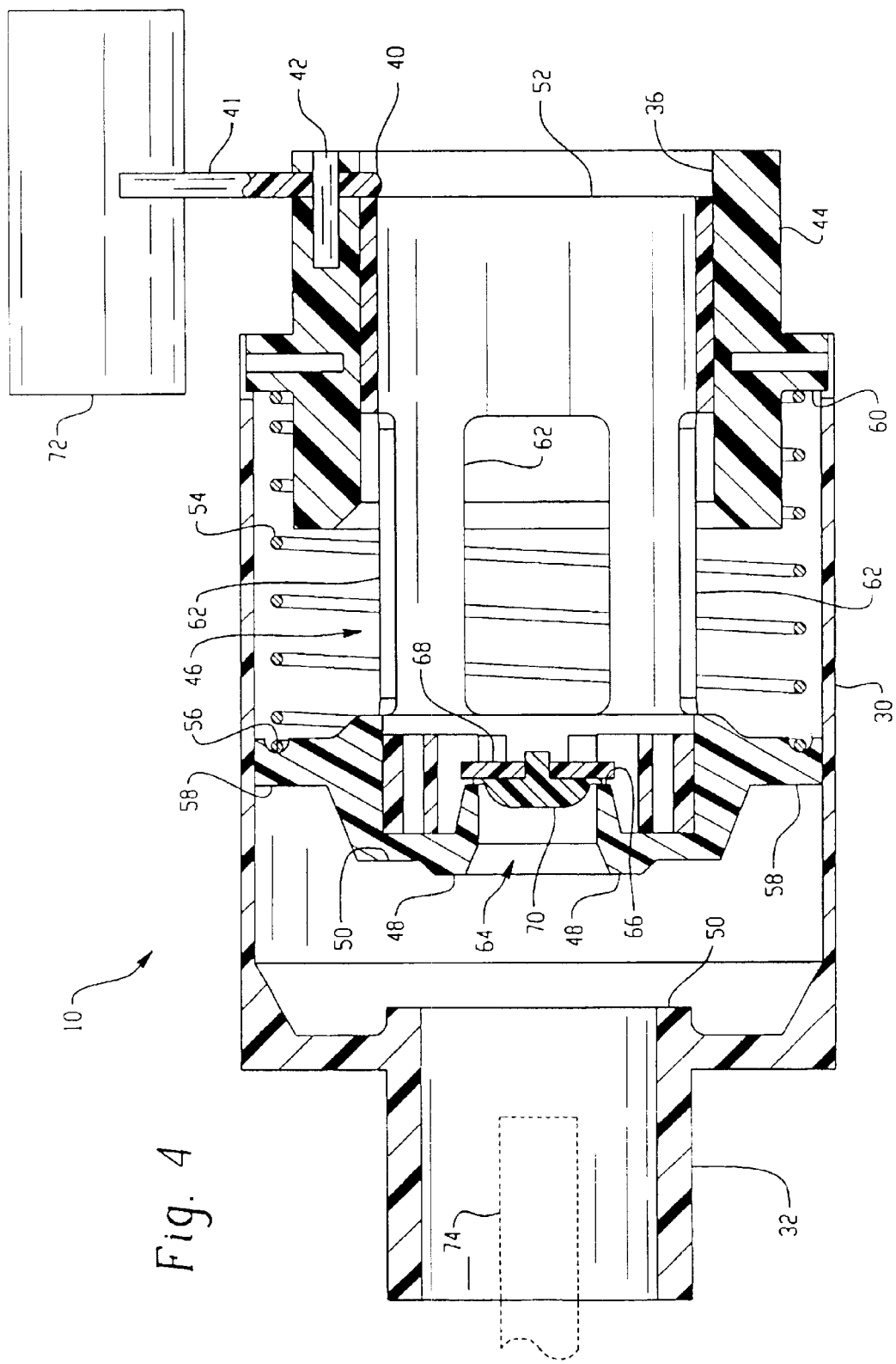
FIG. 4 is a cross-sectional view of the embodiment of FIG. 2 with the poppet opened upon insertion of a refueling nozzle and flow discharge therefrom with the slide valve engaging the float operated latch.
Figure 5:
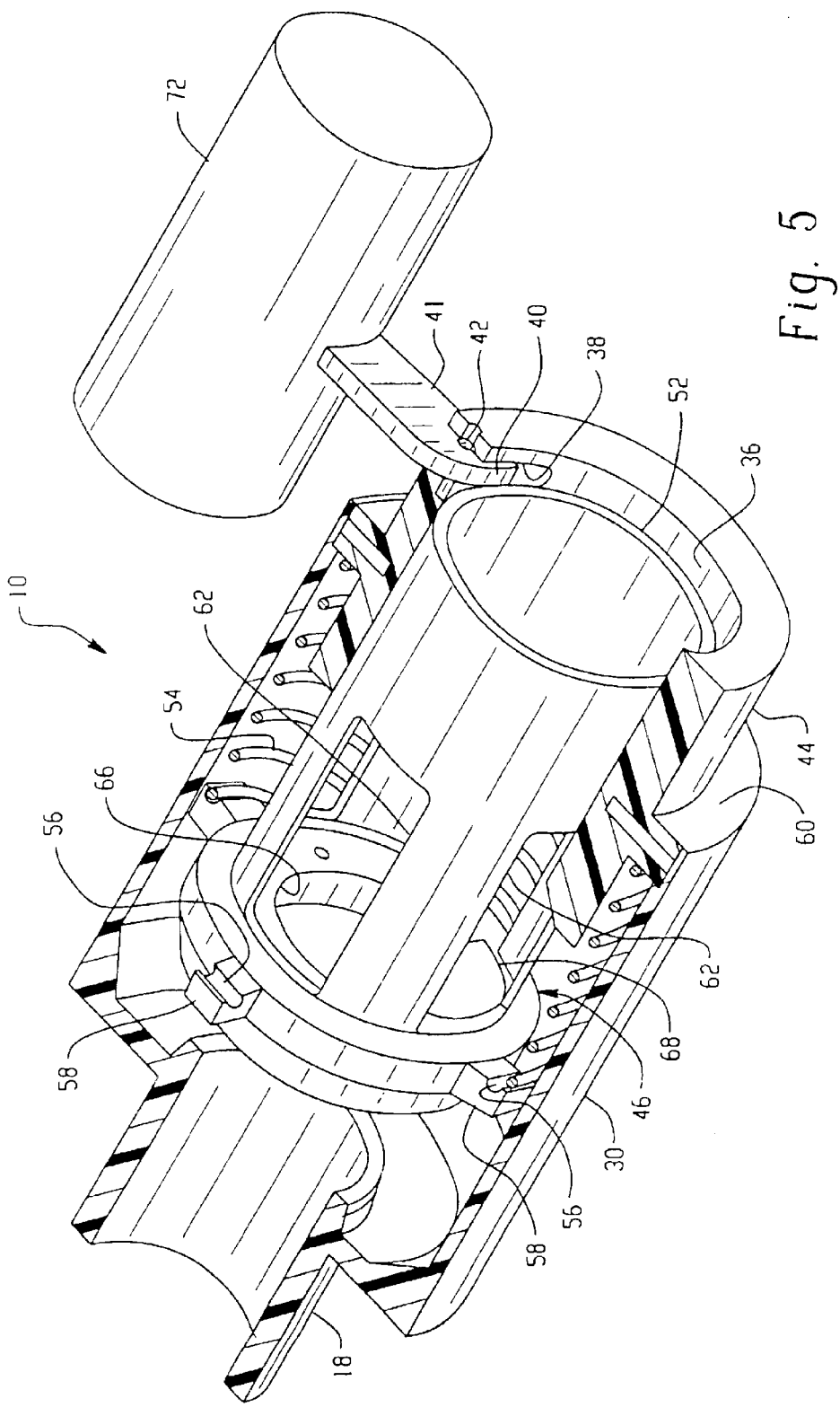
FIG. 5 is a broken-away perspective view of illustration of FIG. 4.

During refueling, with nozzle 28 inserted into the upper end 26 of the filler tube 24 and fuel discharged into the filler tube 24, the fuel entering the nipple 18 forces the poppet 48 rightward away from the valve seat 50 to the position shown in FIGS. 4 and 5. The low level L of the fuel in the tank causes the float 72 to drop, moving lever 41 and latch 40 into position to extend into the interior of surface 36 of member 44 to catch the end of the cylindrical portion 52 or spool of the moveable valve member 46 thereby keeping the slots 62 open. With slots 62 open fuel flows over poppet 48 and between the spring lugs 58 and re-enters the cylindrical portion or spool through slot 62 and flows into the interior of the tank through annular member 44.

Figure 6:
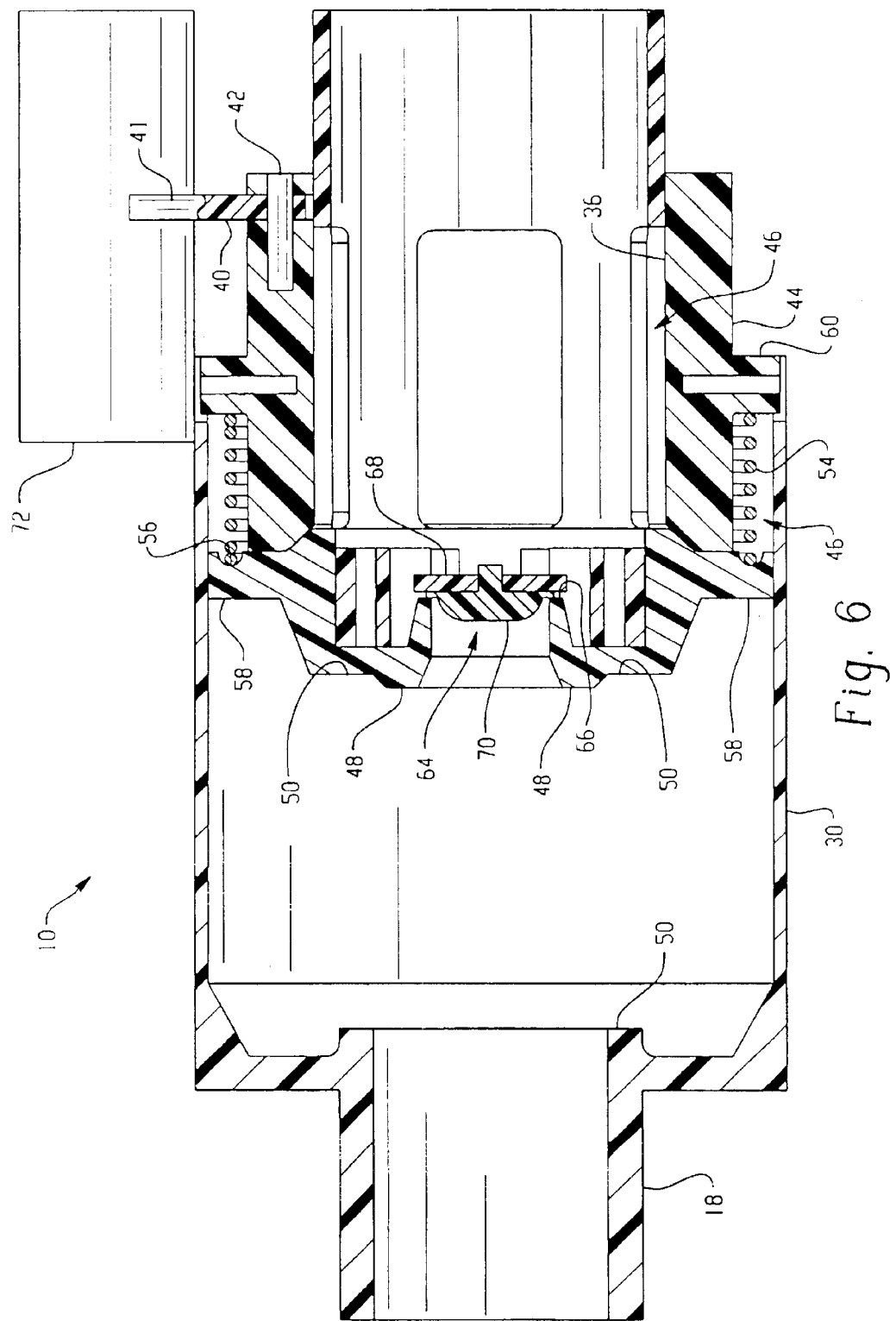
FIG. 6 is a section view of the embodiment of FIG. 2 with the float latch released and the slide valve closed in the tank full condition.
Figure 7:
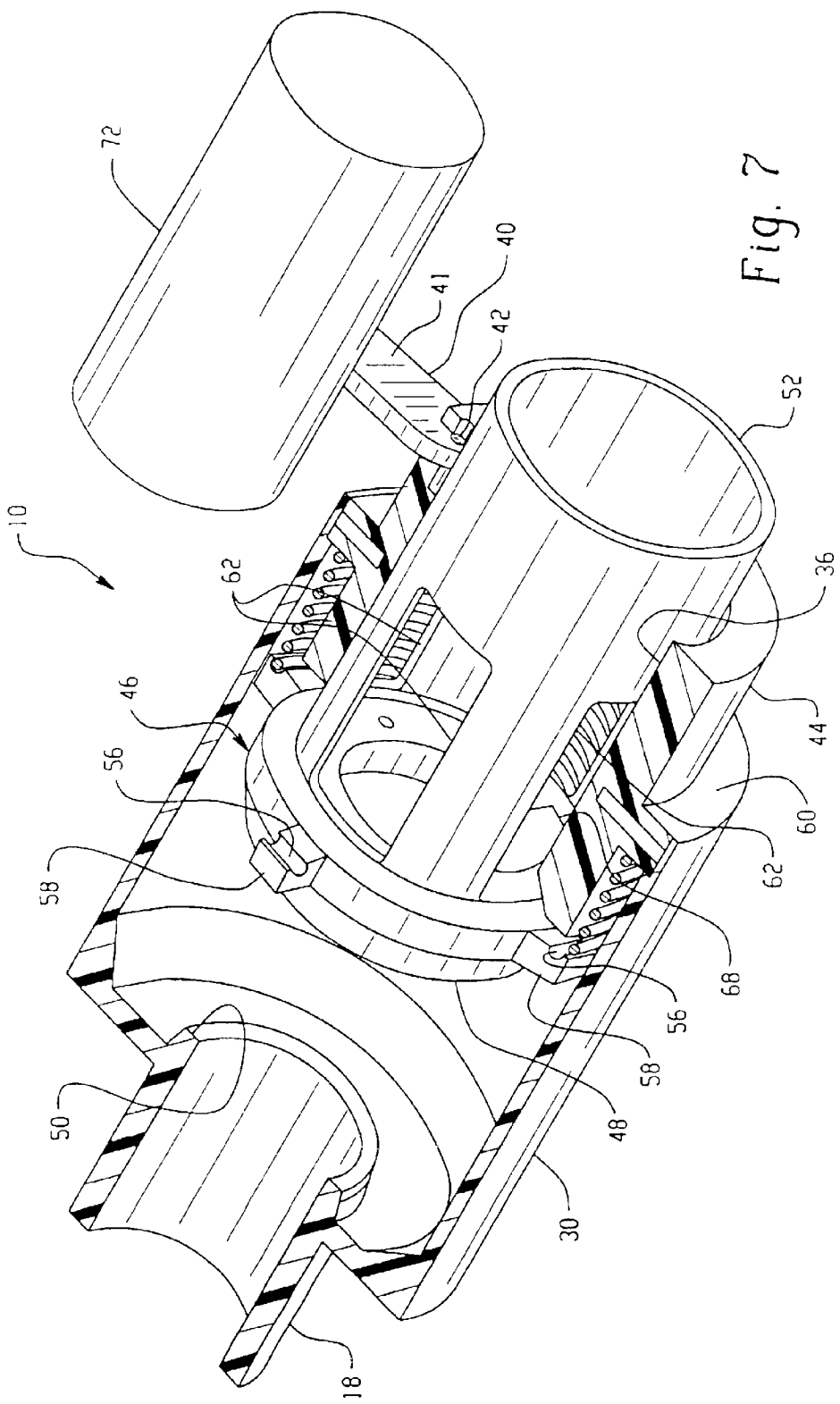
FIG. 7 is a broken-away perspective view of the illustration of FIG. 6.

Upon the fuel level L rising in the tank to the full condition, lever arm 41 and latch member 40 are moved by the float 72 as shown in FIGS. 6 and 7 to a position such that the end of cylindrical portion 52 of the valve member 46 is not restrained; and, the force of the fuel entering though nipple 18 forces the moveable valve member 46 to its rightward limit position compressing spring 54 further and slots 62 of the spool are closed by the interior of annular surface 36, thereby stopping fuel flow to the tank.

The movement of the valve member 46 is limited by the annular surface of the poppet registering against the interior or left end of annular member 44.

Figure 8:
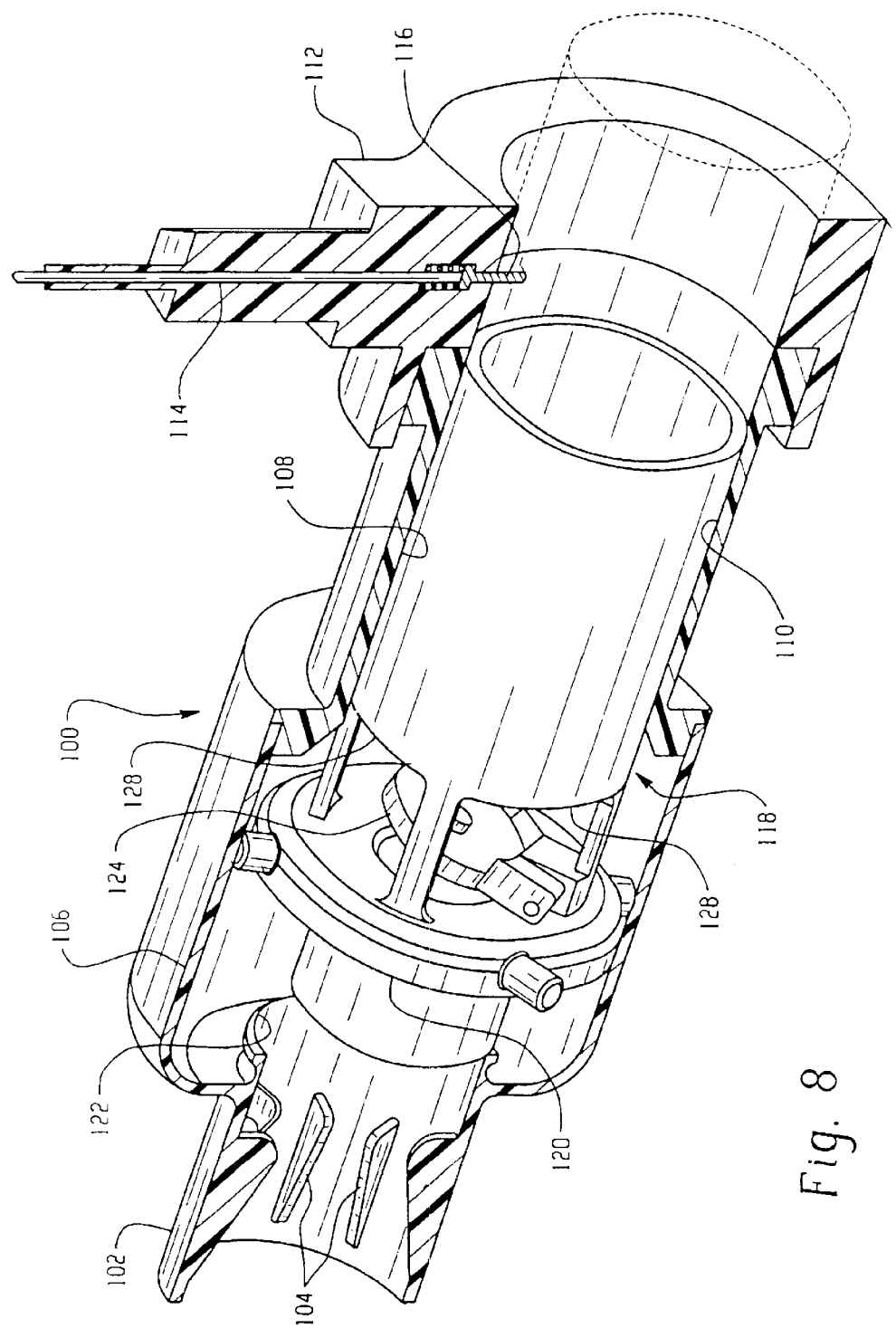
FIG. 8 is a perspective view of an alternate embodiment of the invention broken away to illustrate a cable release for the latch to be actuated remotely by a float.

Referring to FIG. 8, an alternate embodiment 100 of the valve is shown in which the inlet nipple 102 has provided therein a plurality of radially inwardly extending circumferentially spaced vanes 104 which are configured with an axial taper to effect a camming action or centering of a siphoning hose upon insertion therein. The nipple 102 is attached to the valve housing or body 106 which has attached thereto an annular closure 108 having a generally cylindrical surface 110 formed interiorly thereof and with a collar member 112 attached to the end thereof opposite nipple 102. Collar 112 has a cable 114 extending therethrough for releasing a spring biased pin 114 which extends into the interior surface 110 of the annular member 112. It will be understood that the remotely operated cable 114 effects movement of pin 116 in a manner for the same function and purpose as the latch 40 of the embodiment 10 of FIGS. 1 through 7. It will be understood that cable 114 is attached to a remotely located float actuator not shown in FIG. 8.

The embodiment 100 includes a moveable valve member indicated generally at 118 which has a poppet 120 attached to one end thereof for seating against a valve seating surface 122; and, the poppet 120 has a spring biased flapper check valve 120 provided in the center thereof for permitting insertion of a siphoning hose. Valve member 118 includes a hollow cylindrical portion 126 with slots 128 formed therein to effect shut off of the fuel when the member 118 is permitted to be moved rightward to the position indicated in dashed outline in FIG. 8 by raising of the float and pulling of cable 114.

It will be understood that the vanes 104 provided in the embodiment 100 of FIG. 8 may also be employed in the nipple 18 of the embodiment 10 of FIGS. 2 through 7.

The present invention thus provides a novel and relatively low cost, simple to manufacture shut off valve which may be installed in the filler tube of a fuel tank to prevent spit back of fuel upon the tank becoming full during refueling.

The valve has a spring loaded member with a poppet and spool valve with the poppet caused to open upon fuel discharging from a refueling nozzle; and the valve member is latched by a float to permit fuel to enter the tank until the float is raised, thereby releasing the latch and permitting the spool valve to close.

Although the invention has hereinabove been described with respect to the illustrated embodiments, it will be understood that the invention is capable of modification and variation and is limited only by the following claims.

What is claimed is:

1. A method of shutting off flow to a fuel tank from a refueling nozzle comprising:
   (a) providing a filler tube on the tank for receiving the nozzle and extending a portion of the tube into the tank;
   (b) forming a valving chamber with a valve seat in the filler tube;
   (c) forming an obturator having a poppet portion and a hollow tubular portion and forming at least one flow port in the tubular portion and disposing the obturator in the valving chamber for sliding movement therein;
   (d) biasing said poppet against said valve seat with a force and overcoming said force and moving said poppet from said seat when fuel is discharged from said nozzle into said filler tube;
   (e) disposing a float in said tank and engaging and limiting movement of said poppet with downward movement of said float; and,
   (f) releasing said engaging with upward movement of the float and moving said poppet further from said seat and closing said at least one flow port and blocking the filler tube.

2. The method defined in claim 1, wherein said step of forming an obturator with a poppet portion includes forming a one-way valve in the poppet.

3. The method defined in claim 1, wherein said step of forming at least one flow port therein includes forming a plurality of slots.

4. The method defined in claim 1, wherein said step of engaging said poppet includes pivoting a latch member on said filler tube.

5. The method defined in claim 1, wherein said step of disposing said obturator in the valving chamber includes closely fitting said tubular portion in sliding arrangement with said filler tube.

6. The method defined in claim 1, wherein said releasing includes pulling a cable.

7. A method of shutting off flow to a fuel tank from a refueling nozzle comprising:
  (a) providing a filler tube on the tank for receiving the nozzle and extending a portion of the tube into the tank;
  (b) forming a valving chamber with a valve seat in the filler tube;
  (c) disposing a moveable obturator in the valving chamber and moveably biasing said obturator toward the valve seat;
  (d) disposing a float in the tank and moving a latch member with said float and limiting movement of said obturator in a direction away from said valve seat with said latch member when the fuel level in the tank is below a predetermined fill and fuel is discharged into said tube from said nozzle; and
  (e) raising the float and releasing said latch member from said limiting and moving said obturator further from said valve seat and effecting blocking of the filler tube when the fuel level in the tank reaches said fill.

8. The method defined in claim 7, wherein said step of limiting the obturator movement away from said valve seat includes pivoting said latch member with said float.

9. The method defined in claim 8, wherein said step of disposing an obturator includes forming a poppet portion with hollow generally tubular portion attached and forming openings therein for fuel flow from the exterior to the interior thereof.

10. The method defined in claim 7, wherein said step of forming a valve seat includes forming a tapered annular portion in the wall of the filler tube.

11. The method defined in claim 7, wherein said step of biasing said obturator includes disposing a coil spring about the obturator.

12. The method defined in claim 7, wherein said step of disposing a moveable obturator includes forming a poppet with a hollow cylindrical portion and forming a fluid passage through the wall thereof.

13. The method defined in claim 7, wherein said step of disposing an obturator includes disposing a one-way valve through the obturator.

14. The method defined in claim 7, wherein said step of disposing an obturator includes disposing a poppet with a flapper valve therein.

15. The method defined in claim 7, wherein said step of forming a valve chamber with a valve seat includes disposing a resilient annular valve seat in said chamber.

16. The method defined in claim 7, wherein said step of disposing a one-way valve includes disposing a hinged flapper.

17. The method defined in claim 7, wherein said step of disposing a one-way valve includes disposing a flapper with a resilient annular seal moveable therewith.

18. The method defined in claim 7, wherein the step of providing a filler neck includes disposing a plurality of vanes about the filler neck for centering a siphoning hose upon insertion therein.

19. A system for shutting off a refueling nozzle for a fuel tank comprising:
  (a) a filler tube for receiving the nozzle in one end thereof and with an end opposite the one end extending into the tank;
  (b) a valve seat formed in the filler tube;
  (c) an obturator disposed for movement with respect to the valve seat;
  (d) means operable for biasing said movement of the obturator toward said valve seat; and,
  (e) a float disposed in the tank and including a latch member operatively connected thereto for limiting movement of said obturator in a direction away from said valve seat when said float is lowered below a predetermined level and said latch member operative for releasing said limiting when said float is raised to said predetermined level.

20. The system defined in claim 19, wherein said valve seat is formed as one piece with a wall of the filler tube.

21. The system defined in claim 19, wherein said float operated latch comprises a latch surface formed on the float.

22. The system defined in claim 19, wherein said obturator has a one way valve formed therein.

23. The system defined in claim 22, wherein said one way valve comprises a hinged flapper.

24. The system defined in claim 23, wherein said hinged flapper includes a resilient annular seal moveable therewith.

25. The system defined in claim 19, wherein said filler tube includes a plurality of vanes disposed therein for centering a siphoning hose upon insertion thereof.

\* \* \* \* \*